United States Patent
Kim

(10) Patent No.: US 7,386,153 B2
(45) Date of Patent: Jun. 10, 2008

(54) MEDICAL IMAGE SEGMENTATION APPARATUS AND METHOD THEREOF

(75) Inventor: Dong-Sung Kim, Seoul (KR)

(73) Assignee: Infinitt Co., Ltd., Seoul (KR)

( * ) Notice: Subject to any disclaimer, the term of this patent is extended or adjusted under 35 U.S.C. 154(b) by 328 days.

(21) Appl. No.: 10/466,884

(22) PCT Filed: Nov. 11, 2002

(86) PCT No.: PCT/KR02/02106

§ 371 (c)(1),
(2), (4) Date: Apr. 14, 2005

(87) PCT Pub. No.: WO03/043490

PCT Pub. Date: May 30, 2003

(65) Prior Publication Data

US 2005/0207628 A1     Sep. 22, 2005

(30) Foreign Application Priority Data

Nov. 23, 2001   (KR) ................. 10-2001-0073512
Mar. 20, 2002   (KR) ................. 10-2002-0015012

(51) Int. Cl.
*G06K 9/00*   (2006.01)
(52) U.S. Cl. .................. 382/128; 382/164; 382/173
(58) Field of Classification Search ................. 382/128, 382/129, 130, 131, 132, 133, 134, 164, 171, 382/173, 177, 179, 189, 214; 600/424, 427, 600/429, 409, 410, 411; 128/916, 922
See application file for complete search history.

(56) References Cited

U.S. PATENT DOCUMENTS

| | | | | |
|---|---|---|---|---|
| 5,645,066 A * | 7/1997 | Gandini et al. | ............... | 600/443 |
| 5,779,641 A * | 7/1998 | Hatfield et al. | ............... | 600/443 |
| 6,083,162 A * | 7/2000 | Vining | ......................... | 600/407 |
| 6,934,409 B2 * | 8/2005 | Ohara | ......................... | 382/132 |
| 6,947,584 B1 * | 9/2005 | Avila et al. | ................... | 382/131 |

FOREIGN PATENT DOCUMENTS

JP     11-128224 A     5/1999

* cited by examiner

*Primary Examiner*—Abolfazi Tabatabai
(74) *Attorney, Agent, or Firm*—Global IP Counselors, LLP

(57) ABSTRACT

An apparatus and method for segmenting a medical image are provided. The apparatus includes a user interface unit, which provides interface with a user, a volume data input unit, which inputs medical image information; a two-dimensional image display control unit, which receives the volume data, generates and displays a two-dimensional image corresponding to a predetermined position in the medical image, and performs segmentation of the two-dimensional image; and a three-dimensional image display control unit, which receives the volume data, generates and displays a three-dimensional image with respect to the medical image, performs segmentation of the three-dimensional image, transmits the result of the segmentation to the two-dimensional image display control unit, receives position information of the two-dimensional image and the result of the segmentation of the two-dimensional image form the two-dimensional image display control unit, and displaying them on the three-dimensional image.

7 Claims, 20 Drawing Sheets

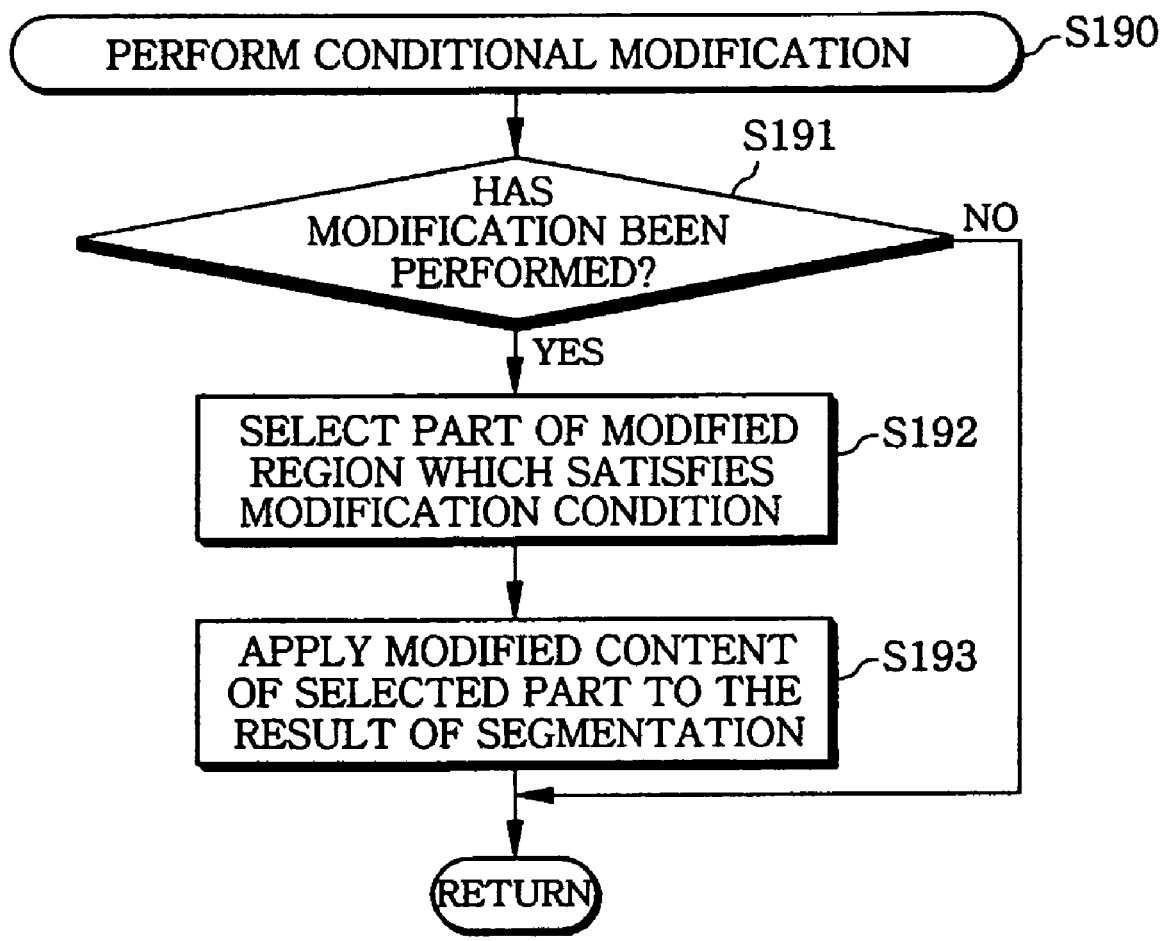
F I G. 6

MEDICAL IMAGE SEGMENTATION APPARATUS AND METHOD THEREOF

TECHNICAL FIELD

The present invention relates to an image processing technique, and more particularly, to a segmentation method for separating a region of interest from a medical image.

An image processing technique is a method including a series of processes, such as receiving multi-dimensional image data and separating a region of interest from a background image, extracting feature information from the image data in order to obtain necessary information, or restoring or reprocessing an image in order to improve image quality. In this image processing, a technique of separating a region of interest from a background image is referred, to as a segmentation technique. This segmentation technique is used to separate a region of interest from a background image and display the region of interest in the form of a two- or three-dimensional image during medical diagnosis or study, thereby increasing the accuracy or efficiency of the result of diagnosis or study. Accordingly, the segmentation technique is an essential image processing technique in the field of medical image processing.

BACKGROUND OF THE INVENTION

In general image segmentation methods, for an image with a particular number of dimensions, segmentation and verification are performed using visualization information of only the particular number of dimensions. For example, when a two-dimensional image is segmented, visualization information of only the two-dimensional image is used. When a three-dimensional image is segmented, visualization information of only the third-dimensional image is used. That is, according to conventional image segmentation methods, although the geometrical characteristics of a segmented region is used for segmentation of a two dimensional image, visualization information of a three-dimensional image is not used for verification of the segmented two-dimensional image. Moreover, according to the conventional image segmentation methods, the result of segmentation using visualization information of a three-dimensional image is not applied to segmentation of a two-dimensional image. Accordingly, the conventional image segmentation methods are disadvantageous in that a user interface is restrictively provided.

In addition, according to the conventional image segmentation methods, segmentation tools by segmentation types and a drawing tool for modification operate independently, so segmentation and modification are performed inefficiently. In other words, operating environments must be separately set for the individual segmentation tools and drawing tool. Since the segmentation and modification results exist independently, a segmentation method using each segmentation tool and the segmentation result are not organically coordinated with each other, so synergy effects cannot be created.

SUMMARY OF THE INVENTION

To solve the above problems, it is an object of the present invention to provided an apparatus and method for segmenting a medical image, in which when an image with a particular number of dimensions is segmented, visualization information of the particular number of dimensions and visualization information of other number of dimensions can be used, and segmentation tools by segmentation types and a drawing tool for modification can operate organically.

To achieve the above or other objects, there is provided an apparatus—for segmenting a medical image. The apparatus includes a user interface unit, which inputs operating signals generated by a user; a volume data input unit, which inputs medical image information in the form of volume data expressed as functions defined in a three-dimensional space; a two-dimensional image display control unit, which receives the volume data of a medical image from the volume data input unit, generates and displays a two-dimensional image corresponding to a predetermined position in the medical image, and performs segmentation of the two-dimensional image; a three-dimensional image display control unit, which receives the volume data of the medical image from the volume data input unit, generates and displays a three-dimensional image with respect to the medical image, performs segmentation of the three-dimensional image, transmits the result of the segmentation to the two-dimensional image display control unit, receives position information of the two-dimensional image and the result of the segmentation of the two-dimensional image from the two-dimensional image display control unit, and displaying them on the three-dimensional image; and a controller, which controls the two-dimensional image display control unit and the three-dimensional image display control unit based on a user's operating signals input through the user interface unit.

There is also provided a method of segmenting a medical image. The method includes receiving medical image information in the form of volume data expressed as functions defined in a three-dimensional space; generating a two-dimensional image and a three-dimensional image with respect to a medical image from the volume data and displaying the two- and three-dimensional images on a screen; when it is requested to segment a predetermine target region from one of the displayed two- and three-dimensional images, performing segmentation in response to the request and applying the result of the segmentation to both the two- and three-dimensional images; and when it is requested to modify a predetermined region in the segmented image, performing modification in response to the request and applying only a part of the modified region that satisfies predetermined modification conditions to the segmented image.

BRIEF DESCRIPTION OF THE DRAWINGS

FIG. 6 is a flowchart of a procedure of performing conditional modification according to the embodiment of the present invention.

DETAILED DESCRIPTION

Hereinafter, embodiments of the present invention will be described in detail with reference to the attached drawings.

Figure 1:
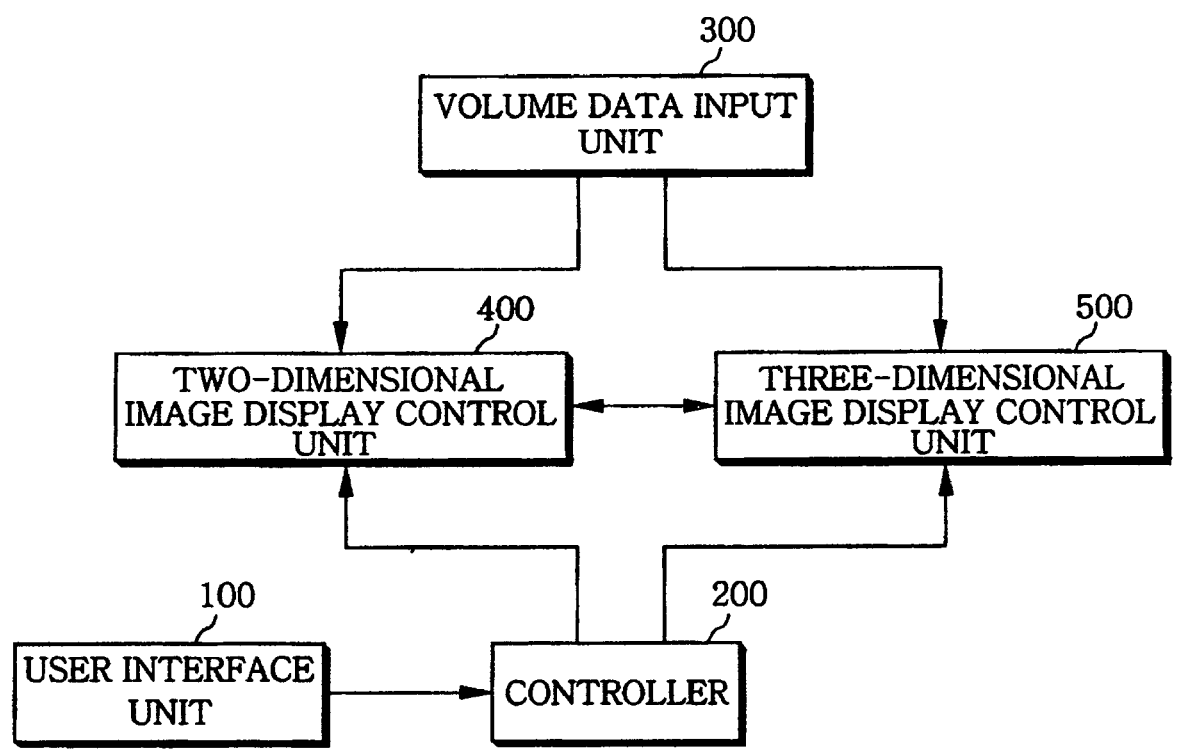
FIG. 1 is a schematic block diagram of an apparatus for segmenting a medical image according to an embodiment of the present invention.

FIG. 1 is a schematic block diagram of an apparatus for segmenting a medical image according to an embodiment of the present invention. Referring to FIG. 1, the apparatus for segmenting a medical image includes a user interface unit 100, a controller 200, a volume data input unit 300, a two-dimensional image display control unit 400, and a three-dimensional image display control unit 500.

The volume data input unit 300 inputs information on a medical image in the form of volume data expressed as functions defined in a three-dimensional space. For example, in a case where volume data, which is generated as the result of computerized tomography (CT) scan or magnetic resonance imaging (MRI), is directly received from each device and stored, the volume data input unit 300 can be composed of connection hardware connected to devices to receive volume data and a hard disc or memory device storing the received volume data. Alternatively, in a case where data, which has already been measured and stored in other storage media (for example, a floppy disc and a CD-ROM), is read, the volume data input unit 300 can be composed of connection hardware connected to internal/external storage devices of systems for these storage media to receive the data and a hard disc or memory-device storing the received data.

The two-dimensional image display control unit 400 receives volume data of a medical image from the volume data input unit 300, generates and displays a two-dimensional image with respect to a predetermined position of the medical image, and performs segmentation of the two-dimensional image. Here, the two-dimensional image display control unit 400 receives the result of segmenting a three-dimensional image from the three-dimensional image display control unit 500 and displays the received result on a currently displayed two-dimensional image. In other words, the two-dimensional image display control unit 400 receives three-dimensional original image information with respect to a three-dimensional image and the result of segmenting the three-dimensional image and reflects the result of the segmentation on an original image so as to generate a new three-dimensional image. Then, the two-dimensional image display control unit 400 generates a two-dimensional image based on information on the new three-dimensional image and displays the generated two-dimensional image.

In addition, the two-dimensional image display control unit 400 transmits the result of segmenting a two-dimensional image to the three-dimensional image display control unit 500 so that the result of segmenting the two-dimensional image can be applied to a three-dimensional image.

The three-dimensional image display control unit 500 receives volume data of a medical image from the volume data input unit 300, generates and displays a three-dimensional image with respect to the medical image, performs segmentation of the three-dimensional image, and transmits the result of segmentation to the two-dimensional image display control unit 400. In the meantime, the three-dimensional image display control unit 500 receives position information of a currently displayed two-dimensional image and the result of segmenting the two-dimensional image from the two-dimensional image display control unit 400, deduces three-dimensional image information from the received position information and result of segmentation, and displays the deduced three-dimensional image information on the three-dimensional image. In other words, the result of segmenting a two-dimensional image is applied to a three-dimensional image.

The user interface unit 100 provides interface with a user. The controller 200 controls the operations of the two-dimensional image display control unit 400 and the three-dimensional image display control unit 500 according to signals, which are generated by the user's operation and input through the user interface unit 100.

Figure 2:
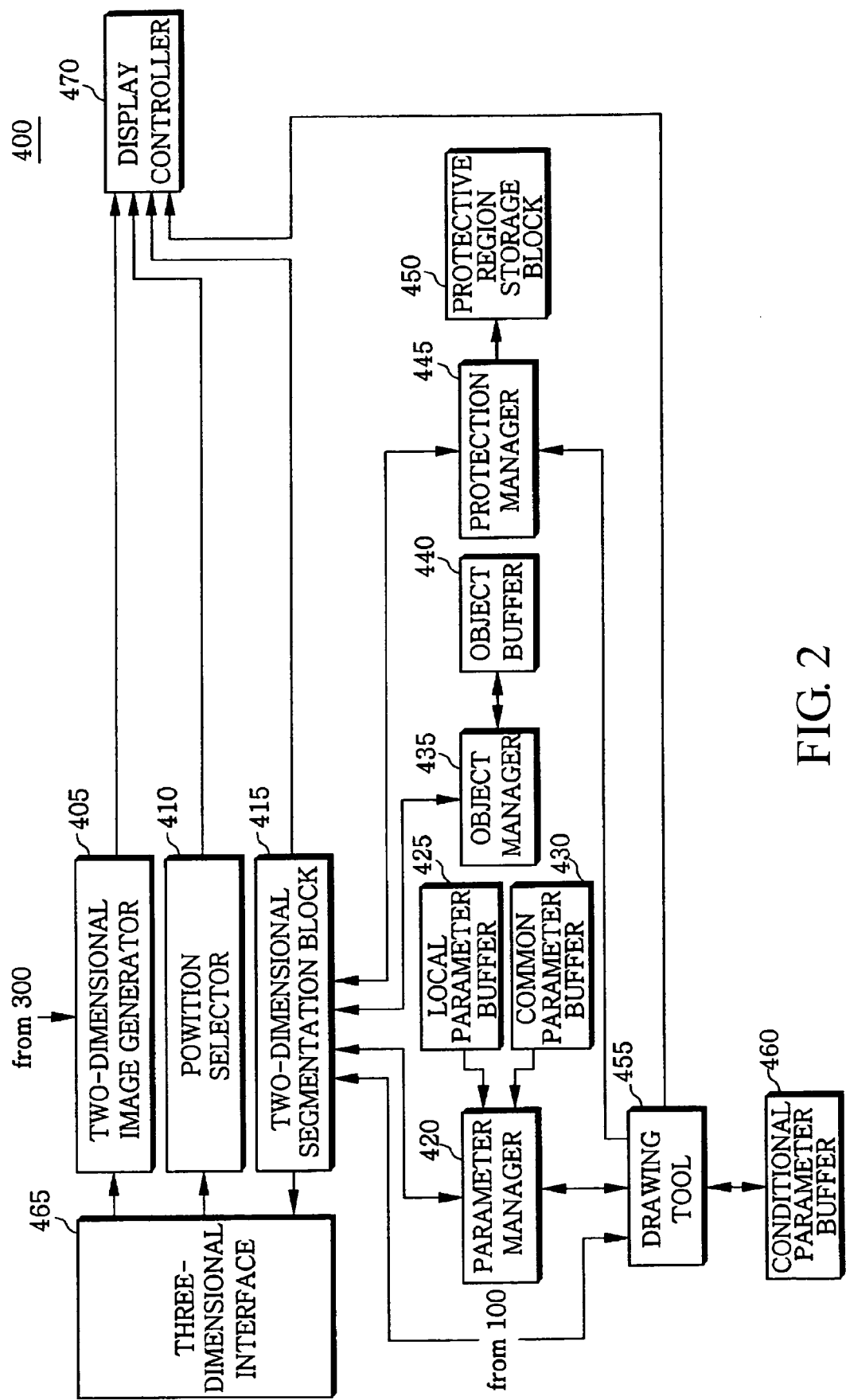
FIG. 2 is a schematic block diagram of a two-dimensional image display control unit according to the embodiment of the present invention.

FIG. 2 is a schematic block diagram of the two-dimensional image display control unit 400 according to the embodiment of the present invention. Referring to FIG. 2, the two-dimensional image display control unit 400 includes a two-dimensional image generator 405, a position selector 410, a two-dimensional segmentation block 415, a parameter manager 420, a local parameter buffer 425, a common parameter buffer 430, an object manager 435, an object buffer 440, a protection manager 445, a protective region storage block 450, a drawing tool 455, a conditional parameter buffer 460, a three-dimensional interface 465, and a display controller 470.

The three-dimensional interface 465 provides interface for data exchange with the three-dimensional image display control unit 500 shown in FIG. 1.

The two-dimensional image generator 405 generates a two-dimensional image to be displayed on a screen using volume data received from the volume data input unit 300 shown in FIG. 1, and displays segmentation information, which is obtained from the result of three-dimensional segmentation received through the three-dimensional interface 465, on the currently displayed two-dimensional image. In other words, the result of three-dimensional segmentation is applied to the two-dimensional image. Since a three-dimensional image has a data structure composed of consecutive two-dimensional images, a k-th two-dimensional image can be derived from the result of three-dimensional segmentation by bringing as much data as an image size from (k−1)*image size.

In the meantime, when an anatomical region to be segmented is well visualized in a three-dimensional image and easily separated from a background, it is easier to perform three-dimensional segmentation than two-dimensional segmentation. For example, the spine and the ribs are well visualized in a three-dimensional image, and when a contrast medium is not injected into the blood vessels, they can be easily separated from a background using a drawing tool because they are positioned at the outer ring of the three-dimensional image.

The position selector 410 receives slice position information, i.e., a slice number, displayed on a three-dimensional image from the three-dimensional image display control unit 500, converts image data corresponding to the slice number to a bitmap structure, and displays the result of conversion on a screen. Here, a slice is a cross section of a three-dimensional image at a predetermined position and is a display unit of a two-dimensional image. Accordingly, the position selector 410 selects two-dimensional image information corresponding to slice information received from the three-dimensional image display control unit 500 and displays the selected two-dimensional image information on the screen.

The two-dimensional segmentation block 415 performs segmentation of a two-dimensional image based on selection information selected through the user interface unit 100 shown in FIG. 1. For example, if a user selects a particular region on a two-dimensional image using, for example, a mouse, the two-dimensional segmentation block 415 performs segmentation of the selected region.

Segmentation methods for medical images can be divided into three different types: a method using the features of a region, a method using the features of a boundary, and a method using the features of both a region and a boundary. In order to effectively perform an operation, the two-dimensional image display control unit 400 separately manages operating environment information, which is commonly applied to the above-described different segmentation methods, for the two-dimensional segmentation block 415 and the results of two-dimensional segmentation, which are obtained in the respective segmentation methods.

For this management, the two-dimensional image display control unit 400 according to the embodiment of the present invention shown in FIG. 2 includes the common parameter buffer 430, which stores and manages common parameters commonly applied to all types of segmentation, and the local parameter buffer 425, which stores and manages local parameters separately applied to the individual types of segmentation. The common parameter buffer 430 and the local parameter buffer 425 are controlled by the parameter manager 420. The parameter manager 420 provides the parameters managed by the common parameter buffer 430 and the local parameter buffer 425 to the two-dimensional segmentation block 415 or the drawing tool 455 at the request of the two-dimensional segmentation block 415 or the drawing tool 455. These parameters set for the segmentation may be parameters defining maximum and minimum brightness, maximum intensity, the numbers of morphological dilations and erosions, maximum and minimum thresholds, tolerance, fill holes/no fill holes, a region-of-interest (ROI) type, a paint type, a pint brush width, and a propagation direction. Among these parameters, the parameters defining maximum and minimum brightness, maximum intensity, the numbers of morphological dilations and erosions, and maximum and minimum thresholds are the common parameters. The parameter defining tolerance is a local parameter applied to only two-dimensional/three-dimensional growth. The parameter defining fill holes/no fill holes is a local parameter applied to only thresholding and two-dimensional/three-dimensional growth. The parameters defining paint type and paint brush width are local parameters applied to only painting. The parameter defining propagation direction is a local parameter applied to only ROI and two-dimensional growth. The drawing tool 455 is provided for a user intending to manually modify the result of segmentation performed in response to the user's selection, and operates according to selection information input by the user through the user interface unit 100.

The object buffer 440 stores objects used for each type of segmentation. The object manager 435 manages the objects stored in the object buffer 440. The object buffer 440 stores segmentation information of the objects in units of slices. Segmentation information with respect to one slice is influenced by segmentation information with respect to adjacent slices. For example, segmentation information with respect to a previous slice can be appropriately applied to segmentation of a current slice. Segmentation information that is consecutively applied to segmentation of the next slice includes the position of a seed point and ROI information.

In the meantime, when the two-dimensional segmentation block 415 segments a target region selected by a user, an adjacent region to the target region is segmented, then the segmented adjacent region is set as a protective region, and then the target region is segmented, in order to prevent information of the target region from leaking into other regions, that is, to protect the target region. For this operation, the two-dimensional image display control unit 400 according to the embodiment of the present invention shown in FIG. 2 includes the protective region storage block 450 for separately managing regions set as a protective region and the protection manager 445 managing the protective region storage block 450.

When the target region is selected through the two-dimensional segmentation block 415, the protection manager 445 detects the position of the boundary of the target region, detects adjacent regions to the position of the boundary, segments the adjacent regions, and sets the segmented adjacent regions as protective regions. In other words, the protection manager 445 labels the segmented adjacent regions and stores them as the protective regions. Thereafter, if segmentation is requested through the two-dimensional segmentation block 415, the protection manager 445 checks whether a target region of the segmentation is a region that is stored in the protective region storage block 450 and allows the segmentation of the target region only when the target region is not a region stored in the protective region storage block 450.

When a two-dimensional image of a predetermined region is modified based on selection information selected through the user interface unit 100, the drawing tool 455 applies only a portion satisfying predetermined modification conditions in the modified region to segmentation. In other words, the drawing tool 455 performs conditional modification. The conditional parameter buffer 460 stores and manages modification conditions and provides corresponding modification conditions to the drawing tool 455 at the request of the drawing tool 455. For example, brightness is a modification condition. For the conditional modification, the drawing tool 455 inspects the conditions of a pixel during modification.

The display controller 470 controls two-dimensional images resulting from the operations of the two-dimensional image generator 405, the position selector 410, the two-dimensional segmentation block 415, and the drawing tool 455 to be displayed on a screen.

Figure 3:
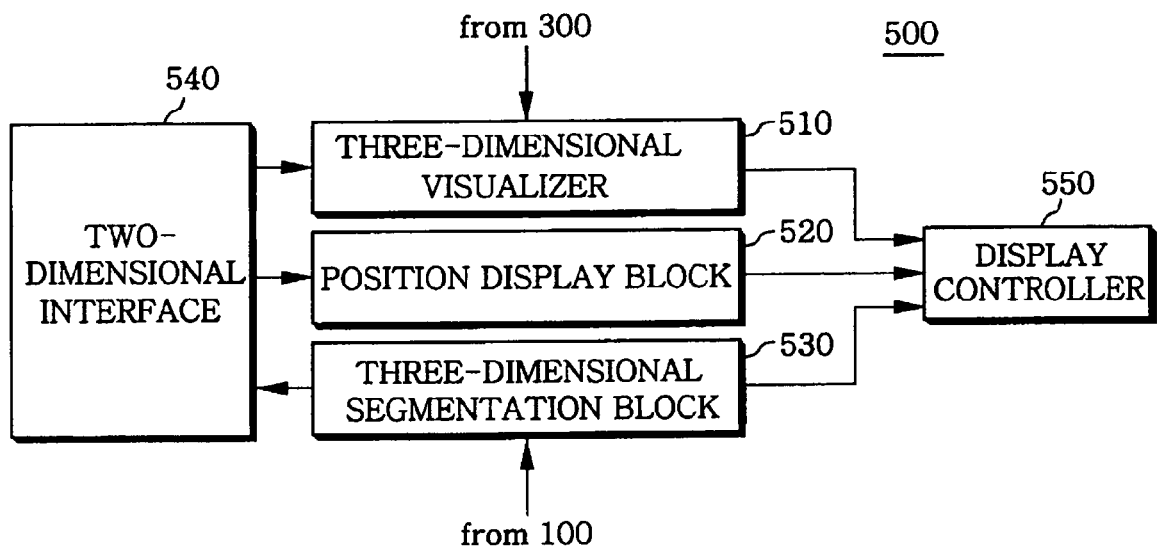
FIG. 3 is a schematic block diagram of a three-dimensional image display control unit according to the embodiment of the present invention.

FIG. 3 is a schematic block diagram of the three-dimensional image display control unit 500 according to the embodiment of the present invention. Referring to FIG. 3, the three-dimensional image display control unit 500 according to the embodiment of the present invention includes a three-dimensional visualizer 510, a position display block 520, a three-dimensional segmentation block 530, a two-dimensional interface 540, and a display controller 550.

The two-dimensional interface 540 provides interface for data exchange with the two-dimensional image display control unit 400.

The three-dimensional visualizer 510 generates a three-dimensional image to be displayed on a screen using volume data received from the volume data input unit 300 shown in FIG. 1, and displays segmentation information, which is obtained from the result of two-dimensional segmentation received through the two-dimensional interface 540, on the currently displayed three-dimensional image. In other words, the result of two-dimensional segmentation is applied to the three-dimensional image. The result of two-dimensional segmentation is an image having a predetermined image size and is stored in a form of an array which can be displayed. In applying the result of two-dimensional segmentation to a three dimensional image, arrays of two-dimensional images are sequentially connected to one another starting from an array of the first two-dimensional image to generate the result of three-dimensional segmentation, and a segmented three-dimensional image is visualized using the result of three-dimensional segmentation. Here, only a volume corresponding to the result of three-dimensional segmentation can be selected and visualized as a three-dimensional image, or the volume data except the volume corresponding to the result of three-dimensional segmentation can be selected and visualized as a three-dimensional image.

As a visualization engine used to display a three-dimensional image on a screen, a volume rendering (VR) engine, a maximum intensity projection (MIP) engine, or a minimum intensity projection (MinIP) engine can be used. The VIR engine makes an image, which is formed by performing volume rendering, such as ray tracing, on three-dimensional data, into a bitmap and shows the bitmap on a screen. The MIP engine makes a bitmap on the basis of the brightness of a pixel on a screen, on which among all three-dimensional voxels meeting a ray during ray tracing, a voxel having a maximum brightness is projected, and displays the bitmap on the screen. The MinIP engine makes a bitmap on the basis of the brightness of a pixel on a screen, on which lo among all three-dimensional voxels meeting a ray during ray tracing, a voxel having a minimum brightness is projected, and displays the bitmap on the screen.

The position display block 520 displays the position of a two-dimensional image of a slice, which is displayed on the two-dimensional image display control unit 400, as a straight line on the three-dimensional image. The position display block 520 exchanges slice position information (i.e., slice numbers) with the position selector 410 shown in FIG. 2 of the two-dimensional image display control unit 400. Accordingly, when an image displayed in the two-dimensional image display control unit 400 is changed, the position display block 520 moves a position display straight line on the three-dimensional image based on slice position information of the changed two-dimensional image. When the position display block 520 moves a position display straight line, an image displayed in the two-dimensional image display control unit 400 is changed based on slice position information, which is generated upon moving the position display straight line.

The three-dimensional segmentation block 530 performs segmentation of a three-dimensional image based on selection information selected through the user interface unit 100 shown in FIG. 1. For example, if a user selects a particular region on a three-dimensional image using, for example, a mouse, the three-dimensional segmentation block 530 segments the selected region. Here, the three-dimensional segmentation block 530 performs segmentation using the properties of three-dimensional volume itself and stores the result of the segmentation in an array of segmented results. In other words, the three-dimensional segmentation block 530 segments a three-dimensional volume satisfying connectivity and homogeneity properties as a separated object and stores the ID of the segmented object at a position corresponding to the object in the array of the results of three-dimensional segmentation. In addition, the three-dimensional segmentation block 530 transmits the result of three-dimensional segmentation to the two-dimensional image display control unit 400 so that the result of three-dimensional segmentation can be applied to a two-dimensional image.

Accordingly, the two-dimensional interface 540 transmits two-dimensional image information from the two-dimensional image display control unit 400 to the three-dimensional visualizer 510, transmits two-dimensional slice position information from the two-dimensional image display control unit 400 to the position display block 520, and transmits the result of three-dimensional segmentation from the three-dimensional segmentation block 530 to the two-dimensional image display control unit 400.

The display controller 550 controls three-dimensional images, which result from the operations of the three-dimensional visualizer 510, the position display block 520, and the three-dimensional segmentation block 530, to be displayed on a screen.

Figure 4:
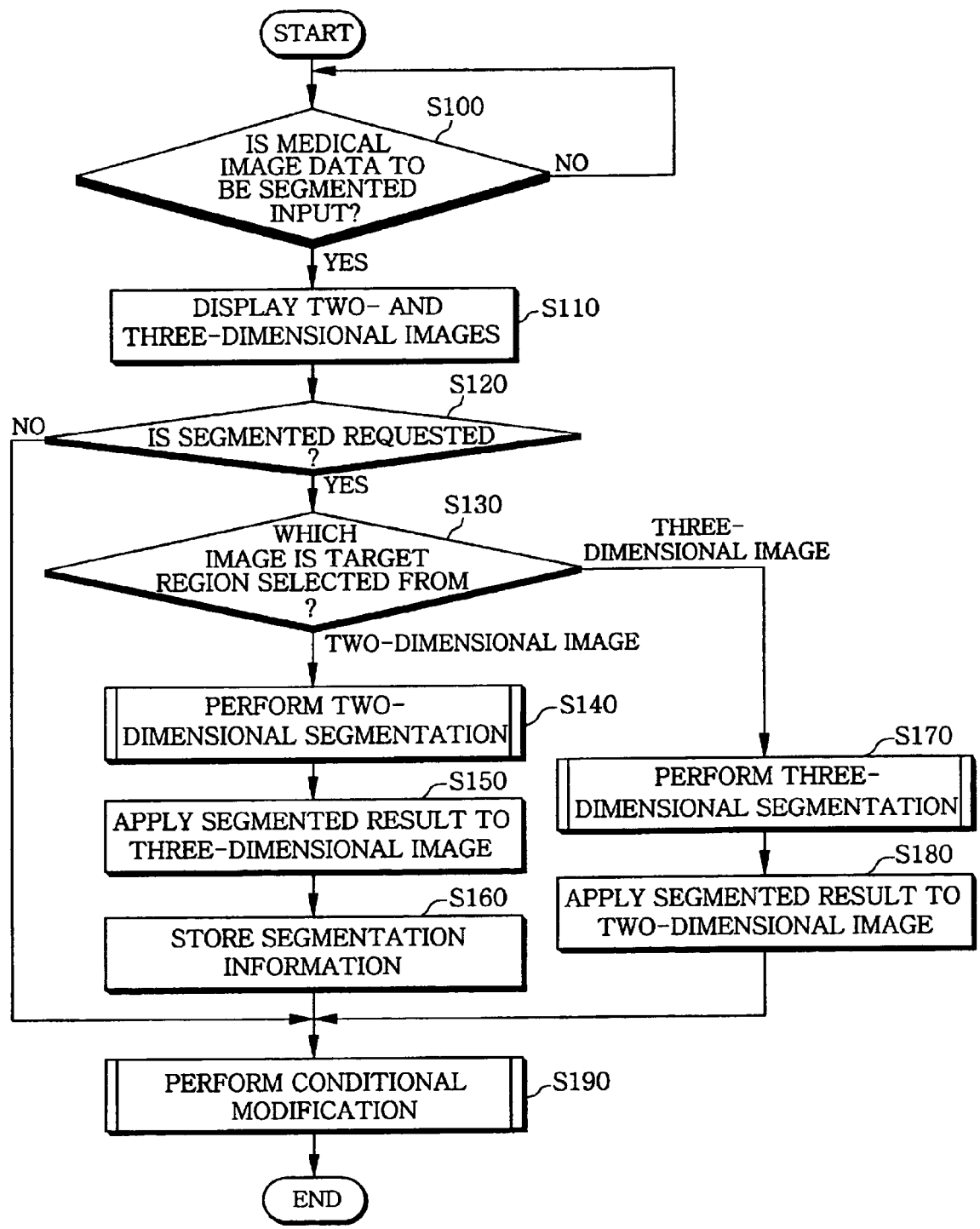
FIG. 4 is a flowchart of a method of segmenting a medical image according to an embodiment of the present invention.

FIG. 4 is a flowchart of a method of segmenting a medical image according to an embodiment of the present invention. Referring to FIG. if medical image information to be segmented is input in the form of volume data expressed as a function of three-dimensional position in step S100, two- and three-dimensional images are detected from the medical image information and displayed through separate display blocks in step S110. Here, the volume data is generated as the result of CT scan or MRI. In the meantime, specific procedures for detecting the two- and three-dimensional images from the medical image information have been widely known, and thus detailed descriptions thereof will be omitted.

If segmentation of a predetermined region from one of the two- and three-dimensional images is requested in step S120, segmentation is performed and the result of the segmentation is applied to both the two- and three-dimensional images in steps S130 through S190.

More specifically, if a user selects the predetermined region as a target region to be segmented and requests segmentation of the target region in step S120, it is determined which image the target region is selected from in step S130. If the target region is determined as being selected from the two-dimensional image, two-dimensional segmentation is performed in step S140. If the target region is determined as being selected from the three-dimensional image, three-dimensional segmentation is performed in step S170. The result of the two-dimensional segmentation and the result of the three-dimensional segmentation are respectively applied to the images with different numbers of dimensions in steps S150 and S180. In other words, the result of the two-dimensional segmentation is applied to the three-dimensional image in step S150, and the result of the three-dimensional segmentation is applied to the two-dimensional image in step S180. When the two-dimensional segmentation is performed, segmentation information is separately stored and managed in units of slices in step S160. When a slice is selected in order to segment a two dimensional image, segmentation information of a previous slice to the selected slice can be referred into for segmentation of the selected slice.

If the user requests manual modification after the segmentation of the target region is completed, modification is performed. Here, a region selected to be modified is not entirely modified, but only a part of the selected region, which satisfies predetermined modification conditions, is modified. In other words, conditional modification is performed in step S190. For example, when brightness is selected as a modification condition, only pixels having brightness in a range of the maximum brightness value through the minimum brightness value are modified. In other words, only pixels whose brightness satisfies the modification condition are modified.

Figure 5:
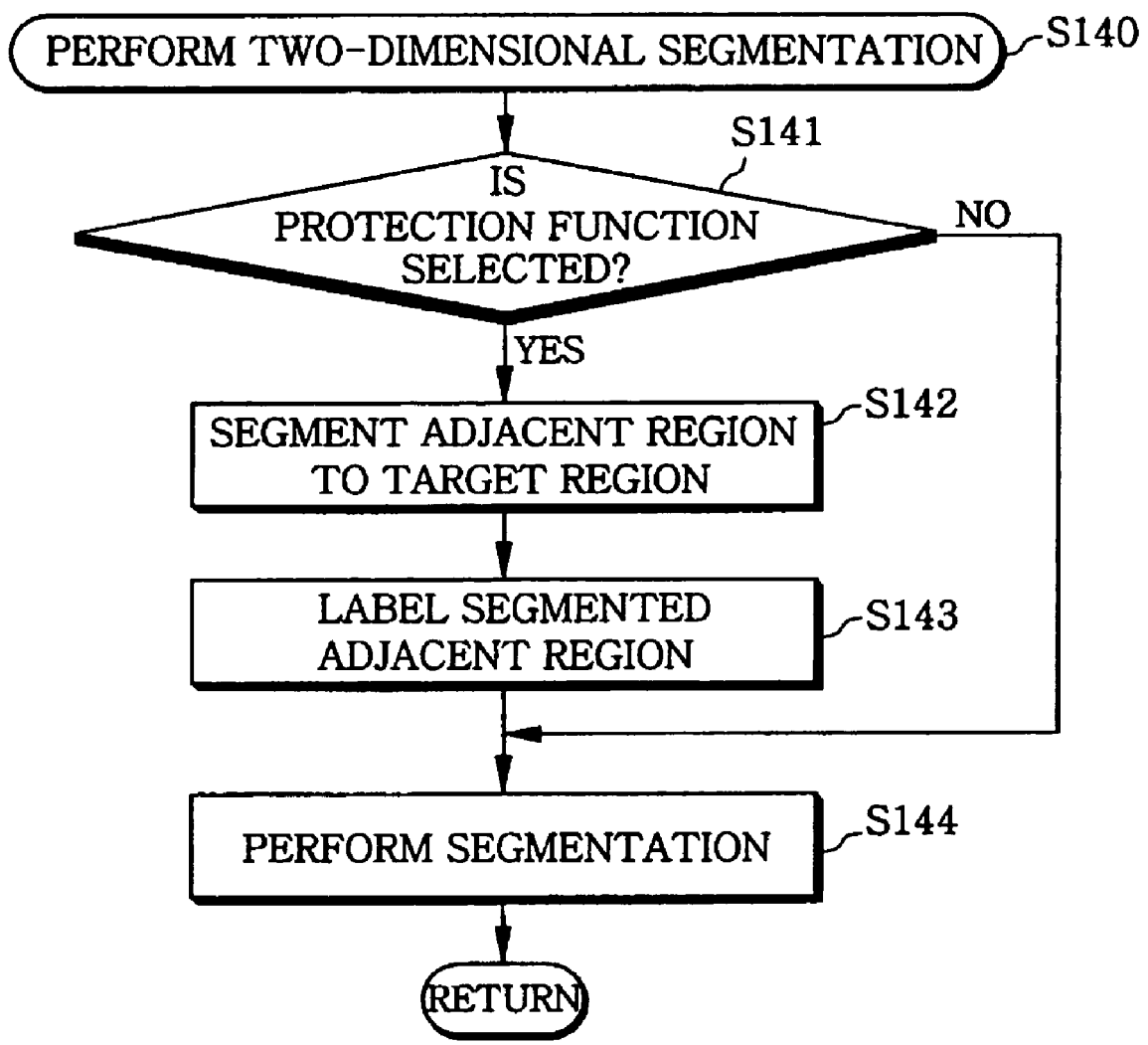
FIG. 5 is a flowchart of a procedure of performing two-dimensional segmentation according to the embodiment of the present invention.

FIG. 5 is a flowchart of step S140 of performing two-dimensional segmentation according to the embodiment of the present invention. Referring to FIG. 5, if it is determined that the user selects a protection function for the target region to be segmented in step S141, an adjacent region to the target region is segmented in step S142. The segmented adjacent region is labeled and separately managed as a protective region in step S143. Next, segmentation is performed on the target region in step S144. Here, the adjacent region managed as a protective region in step S142 and S143 is excluded from segmentation. Therefore, when the target region is segmented, a region other than the target region is prevented from being included in a segment.

In FIG. 5, only step S140 of performing two-dimensional segmentation is described, but the procedure shown in FIG. 5 can be applied to step S170 of performing three-dimensional segmentation.

During two-dimensional segmentation and three-dimensional segmentation, if different types of segmentation are performed, segmentation information set for the different types of segmentation is separately managed. Although some of the segmentation information set for segmentations is applied to each particular type of segmentation, some of the segmentation information is commonly applied to all types of segmentation. Accordingly, by separately managing the segmentation information by the types of segmentation, segmentation can be efficiently performed.

FIG. 6 is a flowchart of step S190 of performing conditional modification according to the embodiment of the present invention. Referring to FIG. 6, if it is determined that the user has performed modification in step S191, a part of the modified region satisfying the modification condition is selected in step S192. Only modified content of the selected part is applied to the result of segmentation in step S193.

FIGS. 7 through 12E show exemplary screens for explaining the operations of an apparatus for segmenting a medical image according to the embodiment of the present invention.

Figure 7:
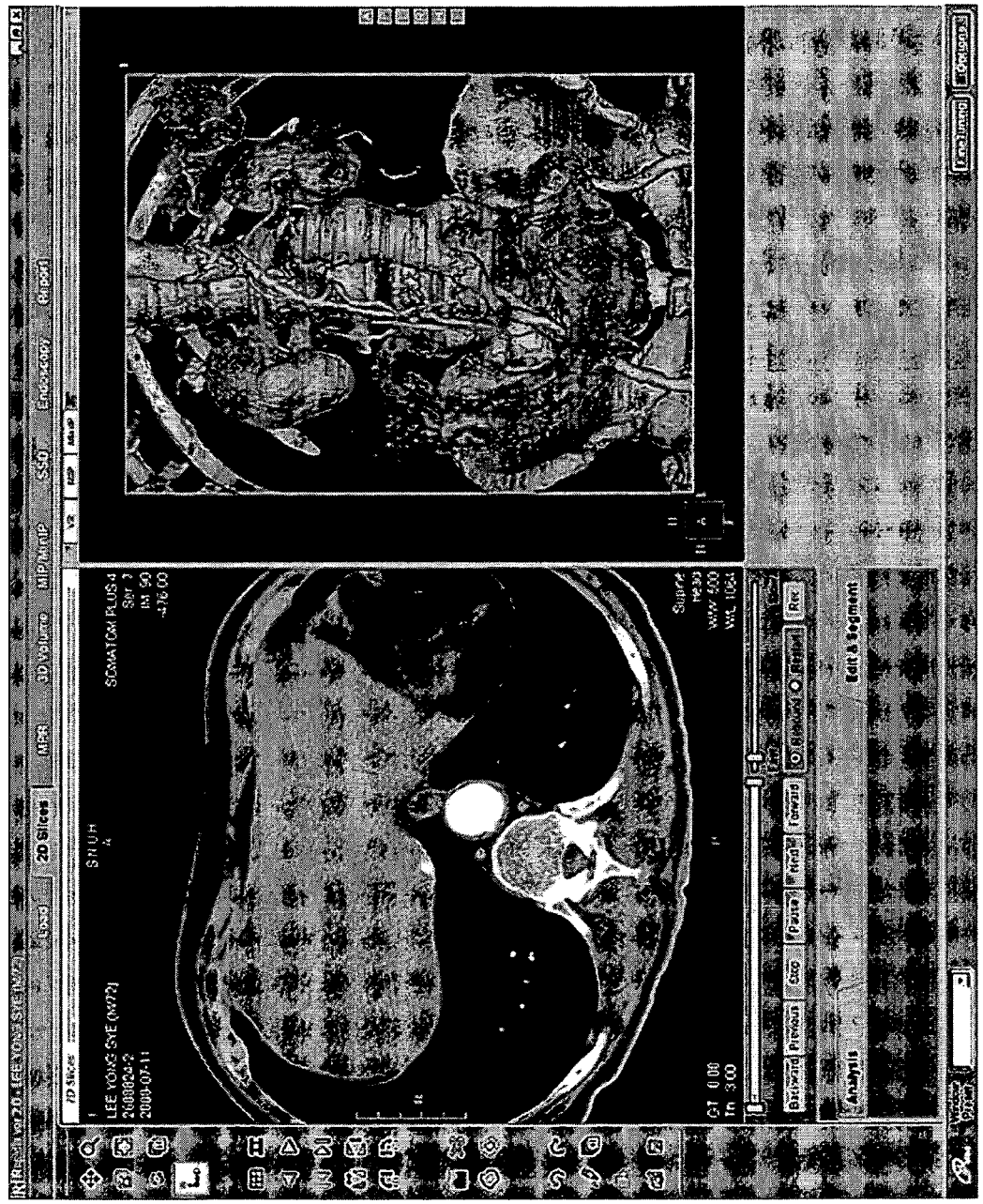
FIG. 7 is a diagram showing an exemplary screen, on which both two- and three-dimensional images are displayed, in an apparatus for segmenting a medical image according to the embodiment of the present invention.

Referring to FIG. 7 a two-dimensional image is displayed in an image display area on the left of a screen, and a three-dimensional image is displayed in an image display area on the right of the screen. Since the two-dimensional image and the three-dimensional image are simultaneously displayed on one screen, a user can increasingly accurately diagnose diseases.

Figure 8A:
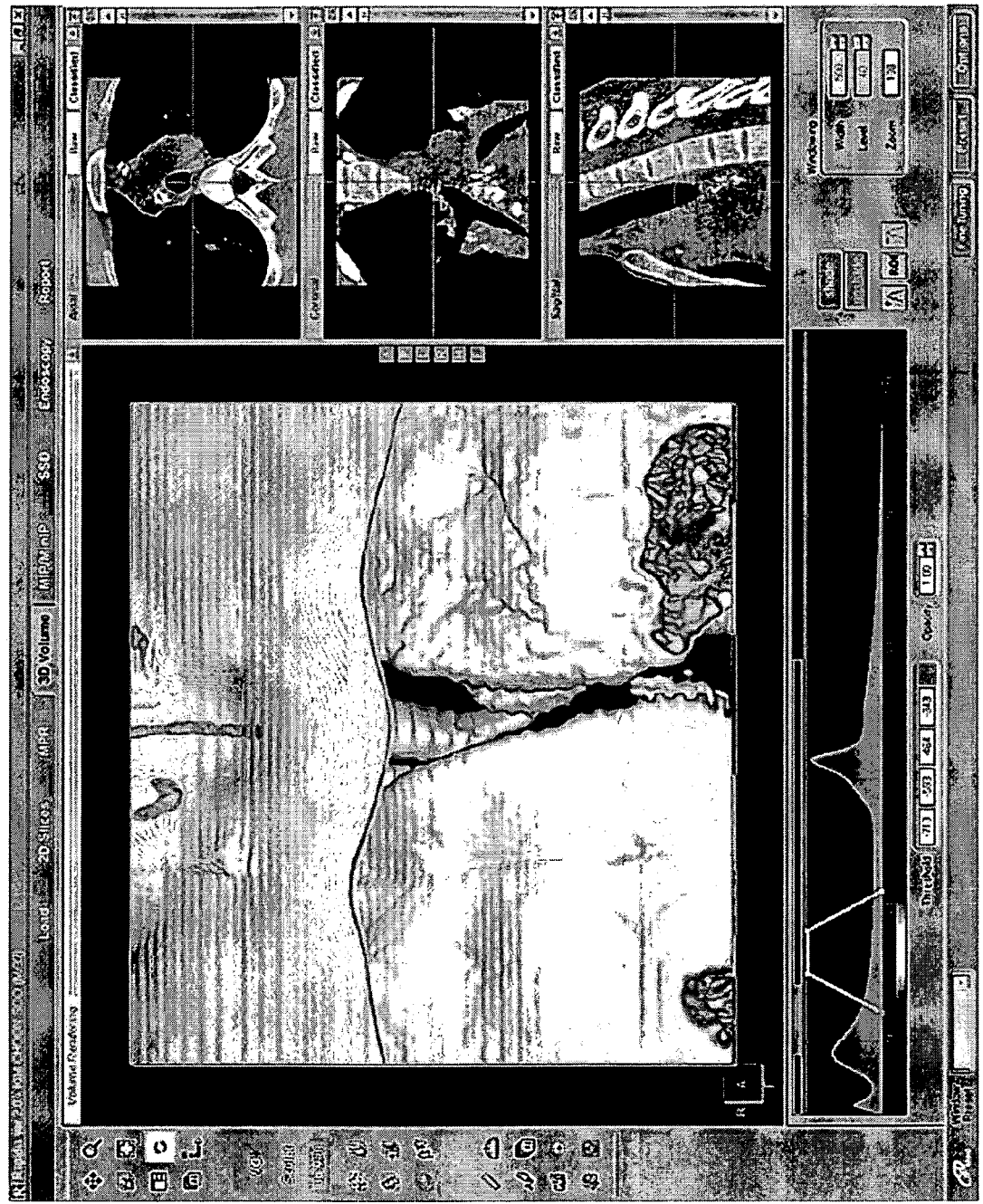
FIGS. 8A through 8C are diagrams showing exemplary screens, on which the result of segmenting a three-dimensional image is applied to a two-dimensional image, in an apparatus for segmenting a medical image according to the embodiment of the present invention.

Referring to FIG. 8A, multi planar reconstructed (MPR) images obtained from CT scan or MRI are displayed in three divided areas on the right of a screen, and a three-dimensional image with respect to the MPR images on the right is displayed in an area on the left of the screen.

Figure 8B:
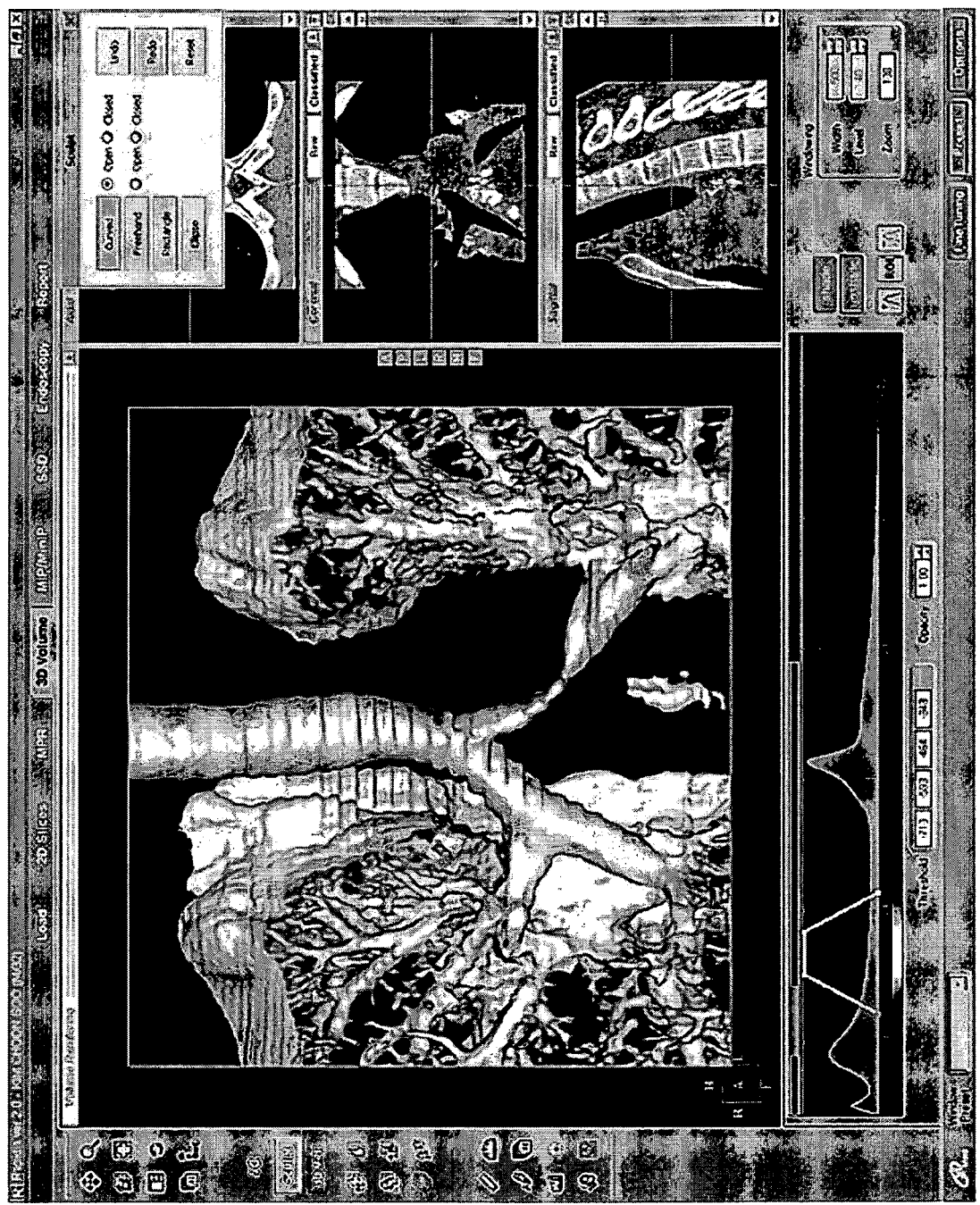

FIG. 8B shows an exemplary screen displaying the result of performing segmentation of the three-dimensional image shown in FIG. Referring to FIG. 8B, when a predetermined region of interest is selected from the three-dimensional image shown in FIG. 8A, only the selected region is segmented from the three-dimensional image and displayed in an areas on the left of the screen.

Figure 8C:
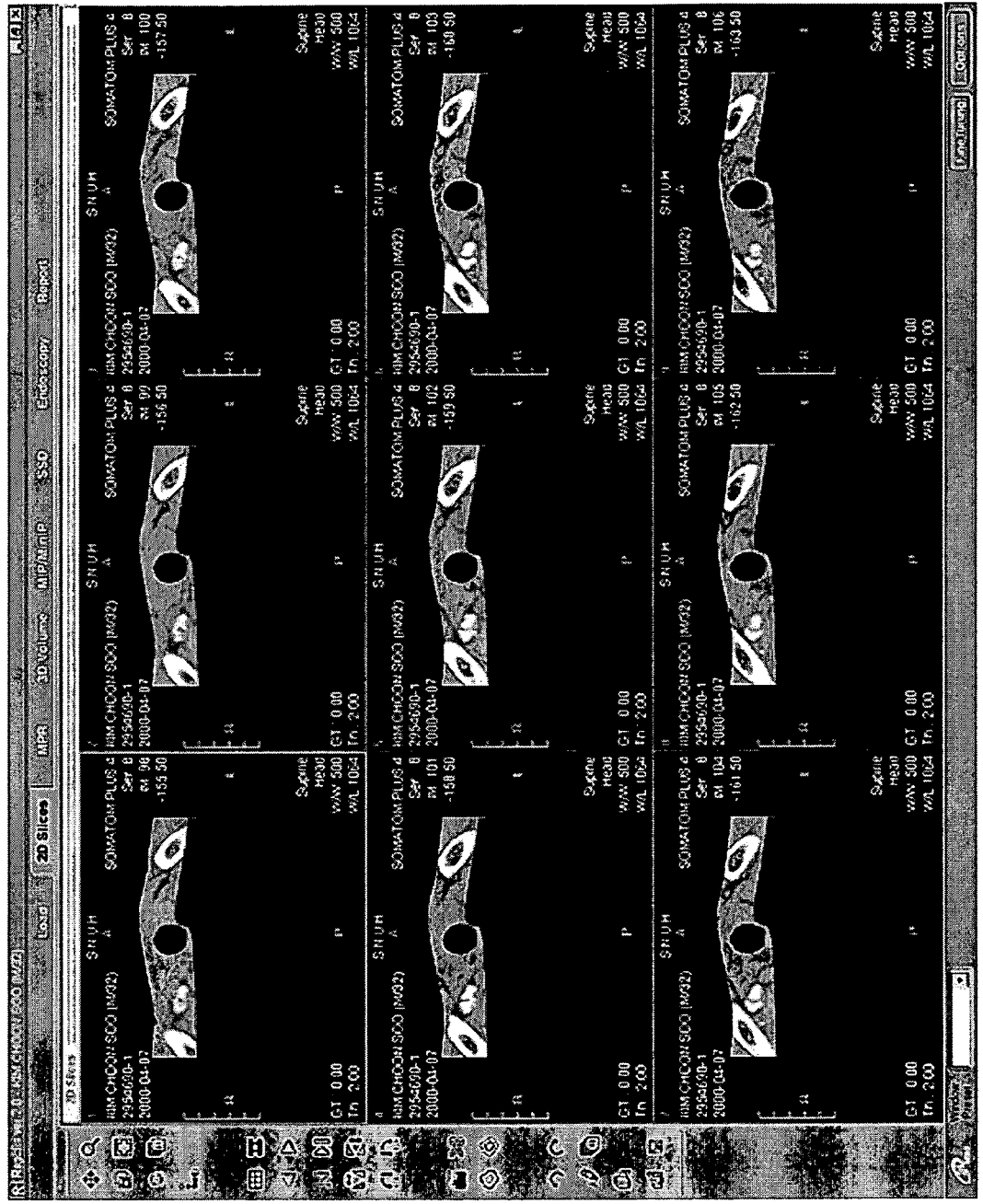

FIG. 8C shows an exemplary screen on which the results of three-dimensional segmentations shown in FIG. 8B are displayed as an two-dimensional images. In FIG. 8C, two-dimensional images showing cross-sections of the three-dimensional image shown in FIG. 8B, taken along different horizontal lines, are sequentially displayed.

Figure 9:
FIG. 9 is a diagram showing an exemplary screen for explaining an example in which segmentation information is transferred to two consecutive slice images in an apparatus for segmenting a medical image according to the embodiment of the present invention.

FIG. 9 shows an exemplary screen for explaining an example in which segmentation information is transferred to two consecutive slice images. In FIG. 9, a current slice image is displayed on the left of the screen, and a next slice image is displayed on the right of the screen. Referring to FIG. 9, when a seeded region growing (SRG) method, which is a segmentation method applied to the current slice on the left, is transferred to the next slice on the right, a seed point A set in the left of the screen for performing the SRG method is transferred to the right of the screen, and thus the image on the right is automatically segmented based on the seed point A.

Figure 10A:
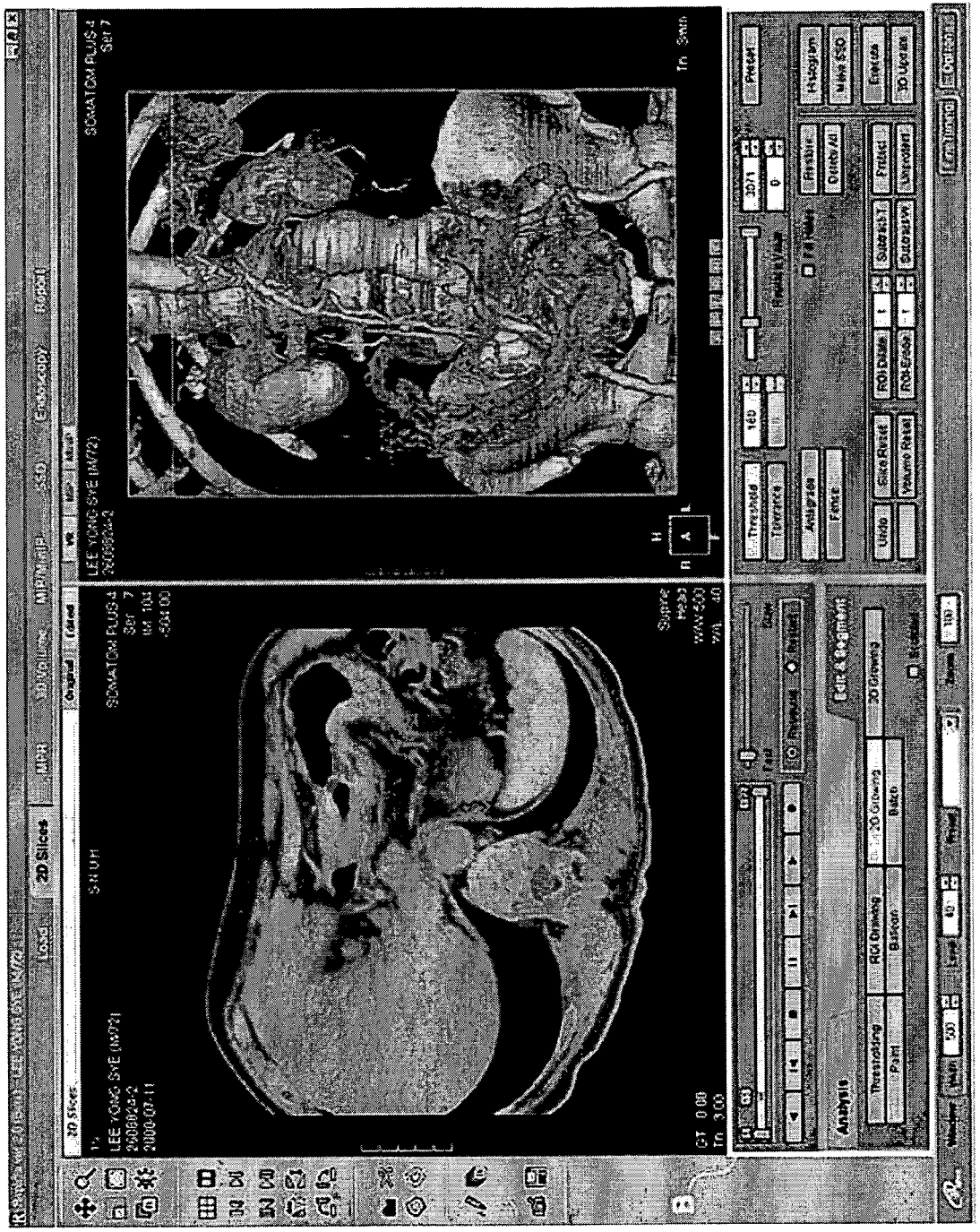
FIGS. 10A and 10B are diagrams showing exemplary screens for explaining an example in which options are shared among different segmentation methods in an apparatus for segmenting a medical image according to the embodiment of the present invention.
Figure 10B:

Referring to FIGS. 10A and 10B, option parameters set for thresholding segmentation in FIG. 10A are used for two-dimensional region growing segmentation in FIG. 10B. In other words, the same option values are set in option setup regions B positioned below each medical image display area in FIGS. 10A and 10B.

Figure 11A:
FIGS. 11A and 11B are diagrams showing exemplary screens for explaining an example in which conditional modification is performed in an apparatus for segmenting a medical image according to the embodiment of the present invention.
Figure 11B:
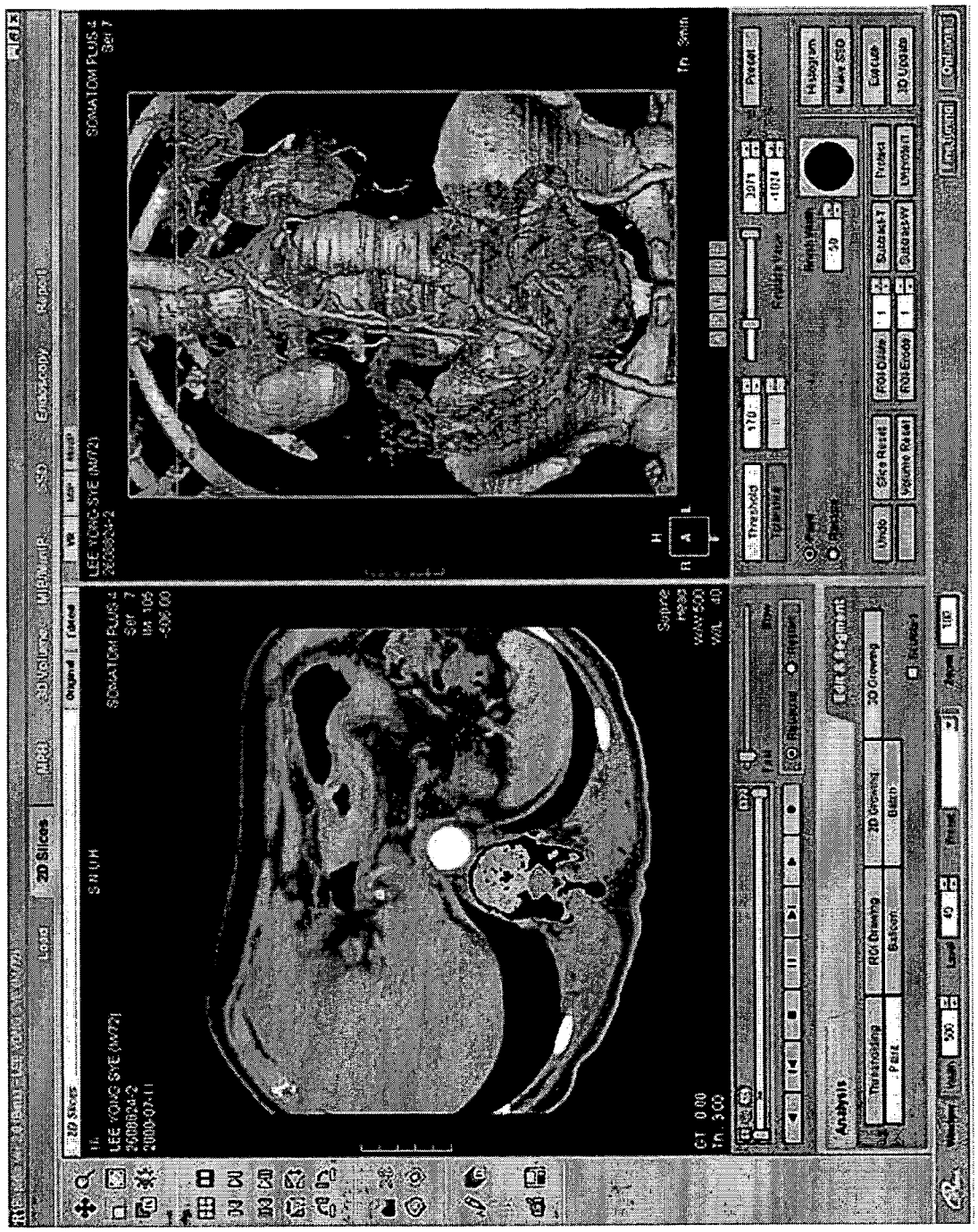

FIG. 11A shows an exemplary screen when a region of interest is selected, and FIG. 11B shows an exemplary screen when only a part of 15 the region of interest is applied to segmentation. In FIG. 11A, a white-colored portion is the region of interest, and vertebrae and muscle are included in the region of interest. In FIG. 11B, only the vertebrae are excluded from the region of interest.

Figure 12A:
FIGS. 12A through 12E are diagrams showing exemplary screens for explaining an example in which an image is segmented using a region protection function in an apparatus for segmenting a medical image according to the embodiment of the present invention.
Figure 12B:
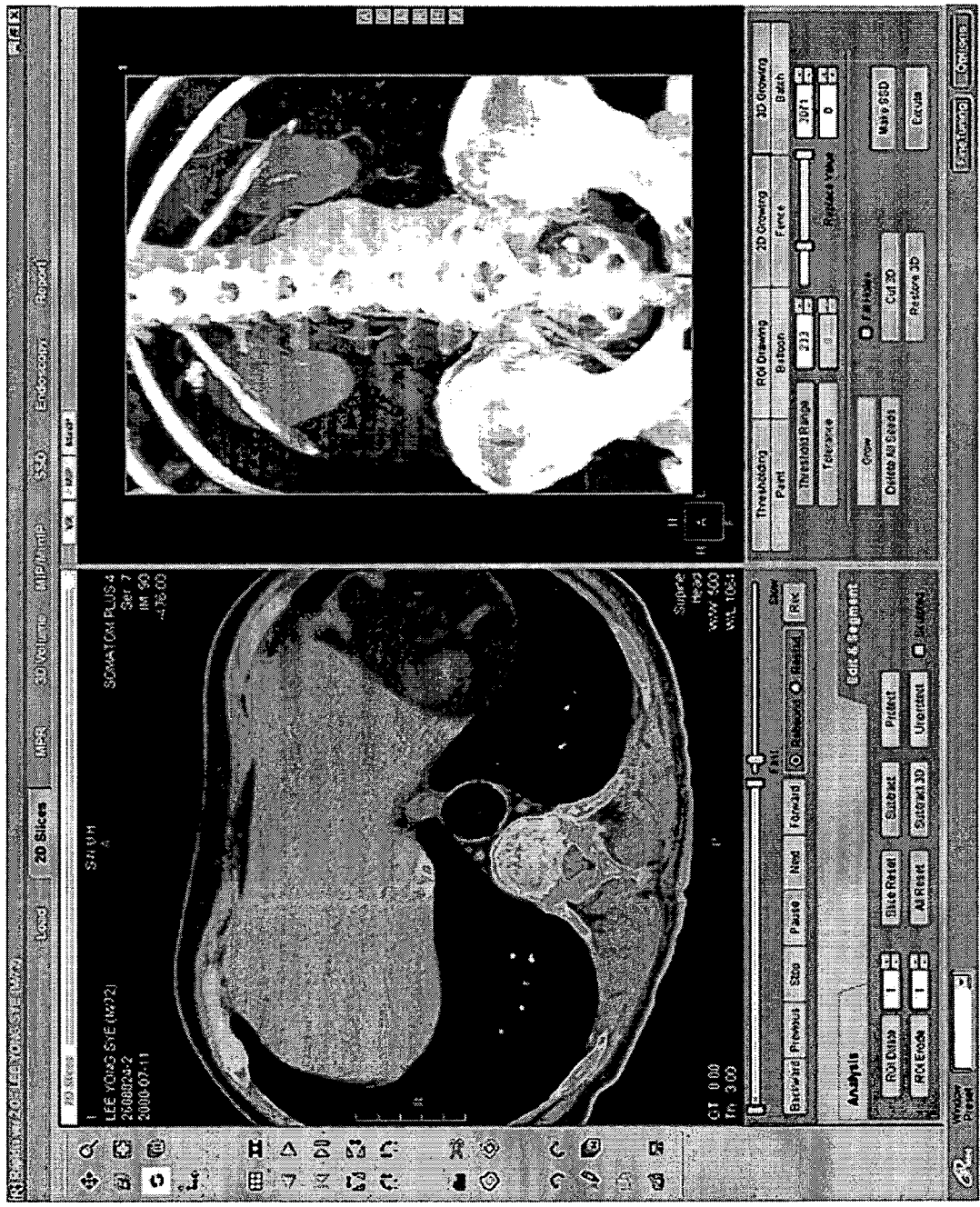
Figure 12C:
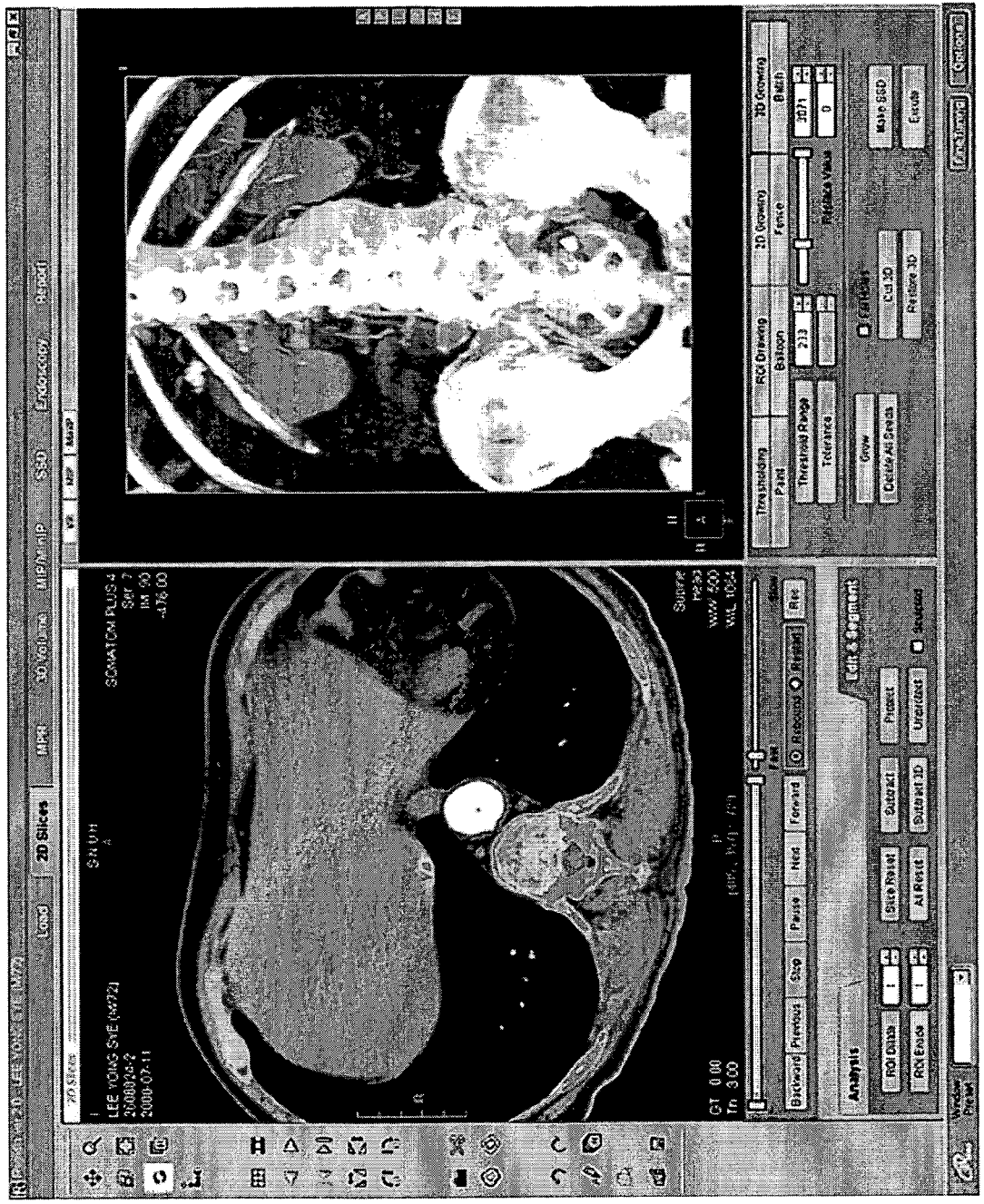
Figure 12D:
Figure 12E:
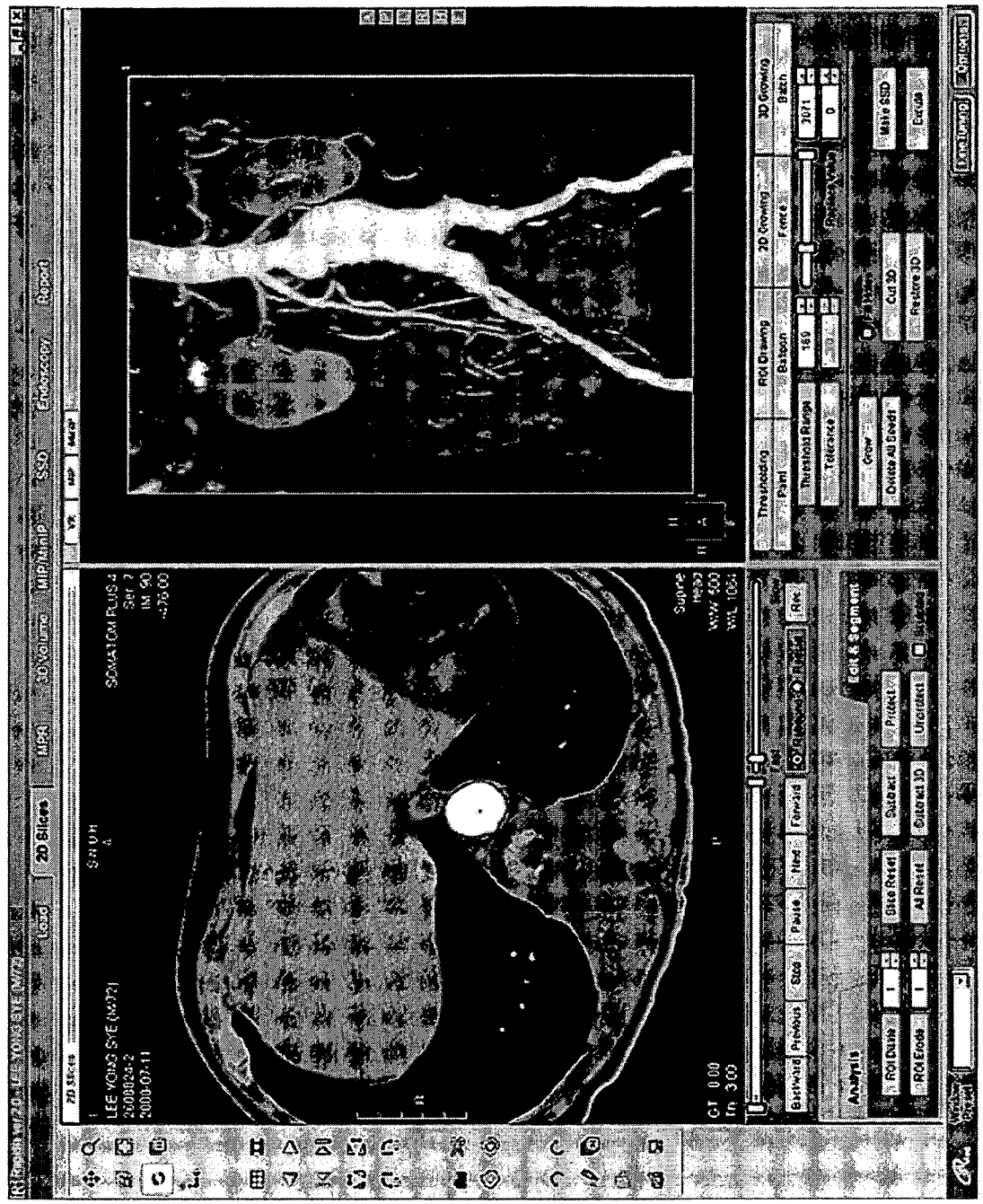

FIGS. 12A through 12E show exemplary screens for explaining an example in which an image is segmented using a region protection function. In other words, FIGS. 12A through 12E illustrate a case where a region protection function is selected in order to segment only a vertebra area from a medical image. FIG. 12A shows the result of segmenting a blood vessel area connected to the vertebrae. FIG. 12B shows the result of setting the segmented blood vessel area as a protective region using the region protection function. FIG. 12C shows the result of three-dimensionally segmenting the vertebra area using an SRG method. FIG. 12D shows the result of releasing the blood vessel area from the protective region shown in FIG. 12B. FIG. 12E shows the result of segmenting and removing the vertebra area from the medical image.

The above description just concerns embodiments of the present invention. The present invention is not restricted to the above embodiments, and various modifications can be made thereto within the scope defined by the attached claims. For example, the shape and structure of each member specified in the embodiments can be changed.

INDUSTRIAL APPLICABILITY

As described above, in an apparatus and method for segmenting a medical image according to the present invention, when an image with a particular number of dimensions is segmented, visualization information of the particular number of dimensions and visualization information of other number of dimensions can be used, thereby providing wide-ranging user interface. For example, when a two-dimensional image is segmented according to the present invention, both visualization information of a two-dimensional image and visualization information of a three-dimensional image can be used.

In addition, the present invention allows segmentation tools by segmentation types and a drawing tool for modification to operate organically thereby efficiently performing image segmentation and modification. For example, operating environments for the segmentation tools by segmentation types and the drawing tool can be simultaneously set, and the processing results by the segmentation tools and the drawing tool are synthetically managed, so a synergy effect can be maximized.

The invention claimed is:

1. An apparatus for segmenting a medical image, comprising:
   a user interface unit, which provides interface with a user;
   a volume data input unit, which inputs medical image information in the form of volume data expressed as functions defined in a three-dimensional space;
   a two-dimensional image display control unit, which receives the volume data of a medical image from the volume data input unit, generates and displays a two-dimensional image corresponding to a predetermined position in the medical image, and performs segmentation of the two-dimensional image;
   a three-dimensional image display control unit, which receives the volume data of the medical image from the volume data input unit, generates and displays a three-dimensional image with respect to the medical image, performs segmentation of the three-dimensional image, transmits the result of the segmentation to the two-dimensional image display control unit, receives position information of the two-dimensional image and the result of the segmentation of the two-dimensional image from the two-dimensional image display control unit, and displaying them on the three-dimensional image; and
   a controller, which controls the two-dimensional image display control unit and the three-dimensional image display control unit based on a user's operating signals input through the user interface unit,
   the two-dimensional image display control unit segmenting an adjacent region to a target region, which is set to be segmented by the selection information, from the two-dimensional image, the two-dimensional image display storing the segmented adjacent region in a protective region storage block, the two-dimensional image display segmenting the target region when the target region is not a region stored in the protective region storage block.

2. The apparatus of claim 1, wherein the two-dimensional image display control unit displays the result of segmentation of a three-dimensional image, which is received from the three-dimensional image display control unit, on a currently displayed two-dimensional image.

3. The apparatus of claim 1, wherein the two-dimensional image display control unit comprises:
   a two-dimensional segmentation block, which performs segmentation of a two-dimensional image based on selection information selected through the user interface unit; and
   a common manager, which separately manages operating environment information commonly applied to all types of segmentation for the two-dimensional segmentation block and the results of segmenting two-dimensional images using different types of segmentation.

4. The apparatus of claim 3, wherein the two-dimensional image display control unit displays further comprises:
   a modification block, which when a predetermined region in the two-dimensional image is modified based on selection information selected through the user interface unit, performs segmentation only a part of the modified predetermined region that satisfies predetermined modification conditions; and
   a condition manager, which stores and manages the predetermined modification conditions and provides the predetermined modification conditions to the modification block at the request of the modification block.

5. A method of segmenting a medical image, comprising:
   (a) receiving medical image information in the form of volume data expressed as functions defined in a three-dimensional space;
   (b) generating a two-dimensional image and a three-dimensional image with respect to a medical image from the volume data and displaying the two and three-dimensional images on a screen;
   (c) when it is requested to segment a predetermine target region from one of the displayed two- and three-dimensional images, performing segmentation in response to the request and applying the result of the segmentation to both the two and three-dimensional images, segmenting an adjacent region to the target region, storing the segmented adjacent region in a protective region storage block, and segmenting the target region when the target region is not a region stored in the protective region storage block; and
   (d) when it is requested to modify a predetermined region in the segmented image, performing modification in, response to the request and performing segmentation only a part of the modified region that satisfies predetermined modification conditions.

6. The method of claim 5, wherein step (c) further comprises when the segmentation is performed on the two-dimensional image, separately storing and managing segmentation information selected for the segmentation of the two-dimensional image in order to refer to it during next two-dimensional segmentation.

7. The method of claim 5, wherein step (c) further comprises separately storing and managing segmentation information, which is selected for the segmentation, and the result of the segmentation by types of segmentation in order to refer to them during next segmentation.

* * * * *